United States Patent
Chiba (10) Patent No.: US 10,578,955 B2
(45) Date of Patent: Mar. 3, 2020

(54) IMAGE PROJECTION SYSTEM AND CORRECTION METHOD THAT CORRECTS A SHAPE OF A PROJECTION PLANE

(71) Applicant: Sony Corporation, Tokyo (JP)

(72) Inventor: Atsuhiro Chiba, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 16/087,130

(22) PCT Filed: Feb. 13, 2017

(86) PCT No.: PCT/JP2017/005070
§ 371 (c)(1),
(2) Date: Sep. 21, 2018

(87) PCT Pub. No.: WO2017/169186
PCT Pub. Date: Oct. 5, 2017

(65) Prior Publication Data
US 2019/0087946 A1   Mar. 21, 2019

(30) Foreign Application Priority Data

Mar. 31, 2016 (JP) .................. 2016-070435

(51) Int. Cl.
*G03B 21/14* (2006.01)
*G03B 21/53* (2006.01)
(Continued)

(52) U.S. Cl.
CPC .......... *G03B 21/147* (2013.01); *G03B 21/00* (2013.01); *G03B 21/14* (2013.01); *G03B 21/53* (2013.01);
(Continued)

(58) Field of Classification Search
CPC .... G06T 5/006; H04N 9/3185; H04N 9/3194; H04N 9/3197; H04N 9/31; H04N 5/74;
(Continued)

(56) References Cited

U.S. PATENT DOCUMENTS

| 6,416,186 B1* | 7/2002 | Nakamura | ............... H04N 5/74 |
| | | | 348/E5.137 |
| 8,003,927 B2* | 8/2011 | Kondo | ................... G03B 17/48 |
| | | | 250/208.1 |

(Continued)

FOREIGN PATENT DOCUMENTS

| EP | 1 427 199 A2 | 6/2004 |
| JP | 2004-187052 A | 7/2004 |

(Continued)

OTHER PUBLICATIONS

International Search Report and English translation thereof dated May 9, 2017 in connection with International Application No. PCT/JP2017/005070.

(Continued)

*Primary Examiner* — Cara E Rakowski
*Assistant Examiner* — Magda Cruz
(74) *Attorney, Agent, or Firm* — Wolf, Greenfield & Sacks, P.C.

(57) ABSTRACT

The image projection system includes a projection-type display apparatus that projects an image onto a projection plane and has a first azimuth detector, the first azimuth detector detecting a projection azimuth; an imaging apparatus that images a projection screen of the image and has a second azimuth detector, the second azimuth detector detecting an imaging azimuth; and a signal processor that performs correction processing of the image. The signal processor includes an estimation unit and a correction unit, the estimation unit estimating an inclination of the projection- (Continued)

type display apparatus to the projection plane on the basis of the projection azimuth detected by the first azimuth detector, the imaging azimuth detected by the second azimuth detector, and the captured image acquired by the imaging apparatus; and the correction unit correcting a shape of the projection screen on the basis of the inclination of the projection-type display apparatus estimated by the estimation unit.

16 Claims, 5 Drawing Sheets

(51) Int. Cl.
  *H04N 9/31* (2006.01)
  *H04N 17/02* (2006.01)
  *H04N 5/74* (2006.01)
  *G03B 21/00* (2006.01)
  *H04N 5/225* (2006.01)
  *G06T 5/00* (2006.01)

(52) U.S. Cl.
  CPC ............. *G06T 5/006* (2013.01); *H04N 5/225* (2013.01); *H04N 5/74* (2013.01); *H04N 9/31* (2013.01); *H04N 9/3185* (2013.01); *H04N 9/3194* (2013.01); *H04N 9/3197* (2013.01); *H04N 17/02* (2013.01)

(58) Field of Classification Search
  CPC ........ H04N 17/02; H04N 5/225; G03B 21/00; G03B 21/53; G03B 21/14; G03B 21/147
  See application file for complete search history.

(56) References Cited

U.S. PATENT DOCUMENTS

| 9,672,602 B2* | 6/2017 | Hara ................... G06T 5/006 |
| 2002/0021418 A1 | 2/2002 | Raskar | |
| 2004/0156024 A1 | 8/2004 | Matsuda et al. | |
| 2005/0280780 A1* | 12/2005 | Matsumoto ............ G06T 5/006 353/70 |
| 2010/0053569 A1* | 3/2010 | Furui .................. H04N 9/3185 353/70 |
| 2013/0057707 A1* | 3/2013 | Hasegawa ............ H04N 9/3194 348/189 |
| 2013/0314388 A1* | 11/2013 | Oda ....................... G03B 21/53 345/207 |
| 2014/0340529 A1 | 11/2014 | Shibata et al. | |

FOREIGN PATENT DOCUMENTS

| JP | 2005-500751 A | 1/2005 |
| JP | 2007-202177 A | 8/2007 |
| JP | 2014-056030 A | 3/2014 |
| JP | 2014-160998 A | 9/2014 |
| WO | WO 03/017655 A1 | 2/2003 |
| WO | WO 2013/038656 A1 | 3/2013 |

OTHER PUBLICATIONS

International Written Opinion dated May 9, 2017 in connection with International Application No. PCT/JP2017/005070, and English translation thereof.
International Preliminary Report on Patentability dated Oct. 11, 2018 in connection with International Application No. PCT/JP2017/005070, and English translation thereof.

* cited by examiner

IMAGE PROJECTION SYSTEM AND CORRECTION METHOD THAT CORRECTS A SHAPE OF A PROJECTION PLANE

CROSS REFERENCE TO RELATED APPLICATIONS

This application is a U.S. National Stage entry under 35 U.S.C. § 371 of International Application No. PCT/JP2017/005070, filed in the Japan Patent Office on Feb. 13, 2017, which claims priority to Patent Application No. JP2016-070435, filed in the Japan Patent Office on Mar. 31, 2016, each of which is incorporated by reference herein in its entirety.

TECHNICAL FIELD

The disclosure relates to an image projection system that uses a projection-type display apparatus to project an image and a correction method of correcting an image for projection.

BACKGROUND ART

A projection-type display apparatus such as a projector, for example, may be disposed at an angle to a screen. In this case, a shape of an image projected onto the screen (hereinafter referred to as a projection screen) is distorted. A technology that corrects such distortion of the projection screen has been proposed (PTL 1 and PTL 2, for example).

CITATION LIST

Patent Literature

PTL 1: Japanese Unexamined Patent Application Publication No. 2007-202177
PTL 2: Japanese Unexamined Patent Application Publication No. 2014-56030

SUMMARY OF THE INVENTION

In an approach of PTL 1, a camera and a gyro sensor are mounted on a main body of a projector apparatus. Thus, an inclination or a position of the main body of the apparatus is sensed and distortion of a projection screen is corrected. In a case of an ultra-short projector, which is, namely, a projector that projects and displays a large-screen image at an extremely short projection distance, however, this approach requests that a camera have a function to perform ultra-wide-angle imaging. This leads to a high cost and thus is impractical.

In addition, PTL 2 describes an image projection system, including a projector that includes a projection posture detection means and an optical axis posture adjustment means, the projection posture detection means including a six-axis sensor and a geomagnetic sensor, for example; and a portable information terminal provided with a remote device posture detection means including the six-axis sensor and the geomagnetic sensor, for example, an irradiation unit that irradiates a guide image, an irradiation layout selection means, and a projection setting calculation means. Then, on the basis of a posture/position when the guide image of the portable information terminal is selected, an amount of size adjustment, an amount of correction of irradiation trapezoidal distortion, a posture/position of an installed projector, and positional information of a projection plane, an optical axis posture and projection size of the projector are adjusted, and the distortion of the projection screen is corrected.

In the approach of the foregoing PTL 2, however, the function of the portable information terminal is restricted and use of a general-purpose smartphone, for example, is not possible. Furthermore, positional information at four corners of the projection plane (longitude, latitude, and altitude) is detected through the use of GPS, for example, and thus the system is large-scale and at a high cost.

It is desirable to provide an image projection system and a correction method that make it possible to correct an image by means of a low-cost and general-purpose imaging apparatus.

An image projection system according to an embodiment of the disclosure includes a projection-type display apparatus that projects an image onto a projection plane and has a first azimuth detector that detects a projection azimuth; an imaging apparatus that images a projection screen of the image and has a second azimuth detector that detects an imaging azimuth; and a signal processor that performs correction processing of the image. The signal processor includes an estimation unit and a correction unit, the estimation unit estimating an inclination of the projection-type display apparatus to the projection plane on the basis of the projection azimuth detected by the first azimuth detector, the imaging azimuth detected by the second azimuth detector, and the captured image acquired by the imaging apparatus, and the correction unit correcting a shape of the projection screen on the basis of the inclination of the projection-type display apparatus that is estimated by the estimation unit.

A correction method according to an embodiment of the disclosure includes estimating an inclination of a projection-type display apparatus to a projection plane on the basis of a projection azimuth of the projection-type display apparatus that projects an image onto a projection plane, an imaging azimuth of an imaging apparatus that images a projection screen of the image, and a captured image acquired by the imaging apparatus, and correcting a shape of the projection screen on the basis of the estimated inclination of the projection-type display apparatus.

According to the image projection system and the correction method of the respective embodiments of the disclosure, the inclination of the projection-type display apparatus to the projection plane is estimated on the basis of the projection azimuth, the imaging azimuth, and the captured image, and the shape of the projection screen is corrected on the basis of the estimated inclination of the projection-type display apparatus.

According to the image projection system and the correction method according to the respective embodiments of the disclosure, it is possible to estimate the inclination of the projection-type display apparatus to the projection plane on the basis of the projection azimuth, the imaging azimuth, and the captured image and to correct the shape of the projection screen on the basis of the estimated inclination of the projection-type display apparatus. The correction of the projection screen is possible through the use of a projection-type display apparatus and an imaging apparatus that have a simpler configuration. In addition, it is not necessary that the imaging apparatus have a special function such as an irradiation function of a guide light to the projection plane. Therefore, it is possible to perform image correction using the low-cost and general-purpose imaging apparatus.

It is to be noted that the above description is an example of the disclosure. The effects of the disclosure are not limited to those described above, but may be other different effects or may further have other effects.

MODES FOR CARRYING OUT THE INVENTION

In the following, some embodiments of the disclosure are described in detail with reference to the drawings. It is to be noted that the description is given in the following order.

Embodiments (Example of an image projection system that calculates an inclination of a projector on the basis of a projection azimuth of the projector, an imaging azimuth of a portable terminal, and a captured image, and that corrects a shape of a projection screen on the basis of the inclination)
1. Configuration
2. Workings (Correction Method)
3. Effects

Embodiments

[Configuration]

Figure 1:
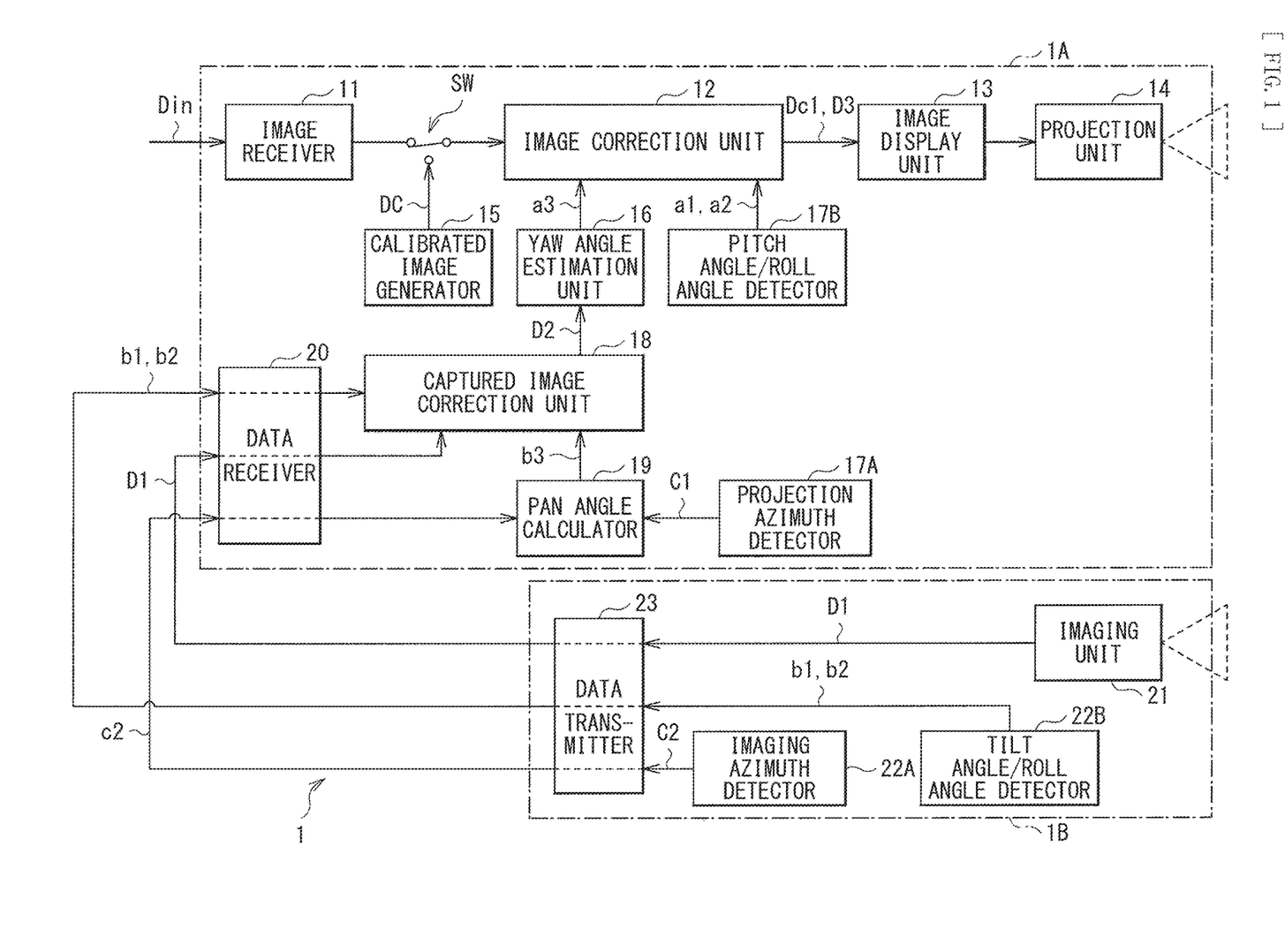
FIG. 1 is a block diagram of a functional configuration example of an image projection system according to an embodiment in the disclosure.
Figure 2:
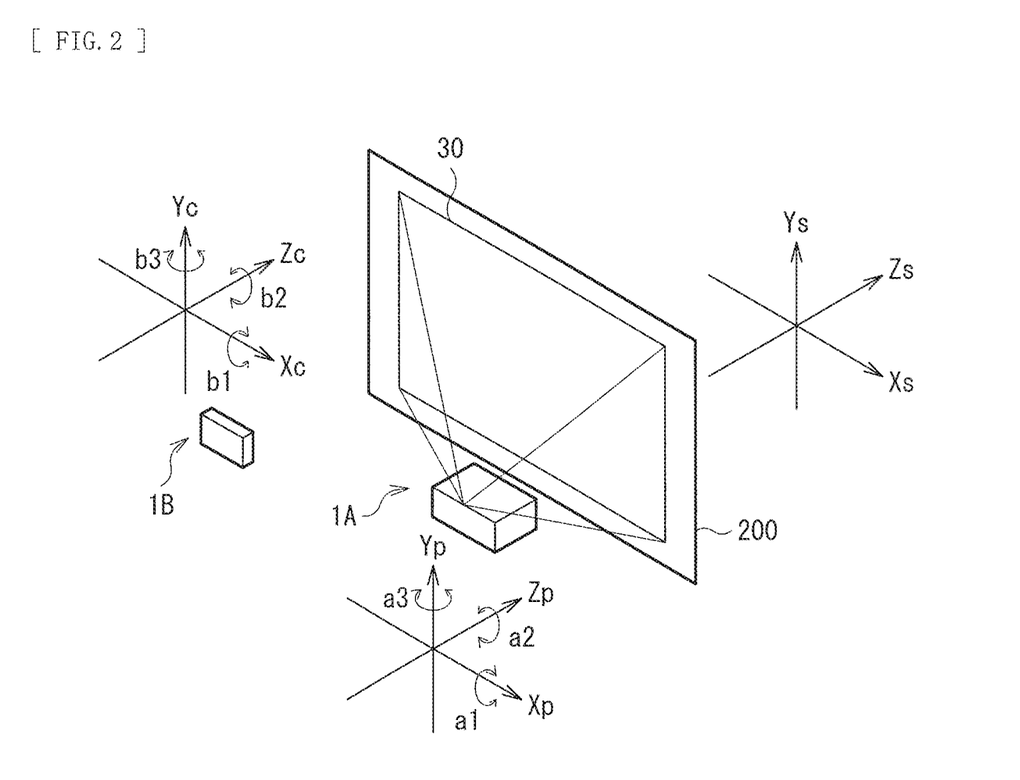
FIG. 2 is an explanatory diagram of a rotation angle in a projector and a portable terminal.
Figure 3:
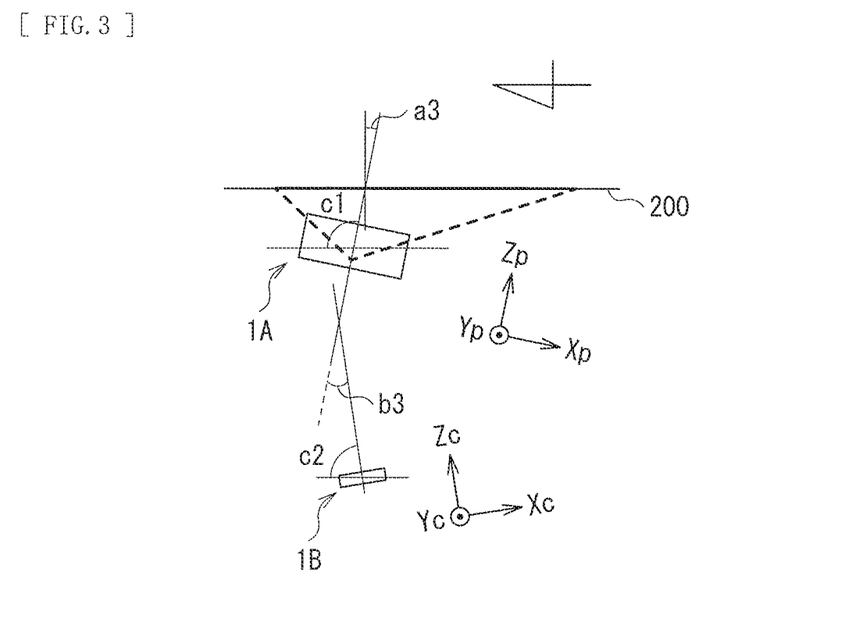
FIG. 3 is an explanatory diagram of an azimuth of each optical axis of the projector and the portable terminal.

FIG. 1 is a diagram of a configuration of an image projection system (image projection system 1) including an image projection system (image projection system 1) according to an embodiment of the disclosure. The image projection system 1 includes a projector 1A and a portable terminal 1B. FIG. 2 is an explanatory diagram of a rotation angle in the projector 1A and the portable terminal 1B. FIG. 3 is an explanatory diagram of an azimuth of each optical axis of the projector 1A and the portable terminal 1B.

First, with reference to FIG. 2, an orthogonal coordinate system and an inclination (rotation angle) of the projector 1A and the portable terminal 1B are described. An orthogonal coordinate system Xs-Ys-Zs is a static coordinate system based on a direction of gravitational force and a screen 200. Here, by way of example, an Xs axis is a horizontal direction, and a Ys axis is a vertical direction. A projection plane (projection plane 30) of the screen 200 is a plane parallel to an Xs-Ys plane, and a Zs axis is along a normal direction of the Xs-Ys plane. It is to be noted that the screen 200 is not inclined to the direction of the gravitational force.

An orthogonal coordinate system Xp-Yp-Zp is a moving coordinate system based on the projector 1A. An Xp axis is a right-left direction, a Yp axis is an up-down direction, and a Zp direction is a front-back direction. The Zp axis matches a projection optical axis (optical axis of a projection lens). An output angle of a projection light is symmetrical to a Yp-Zp plane. In addition, a pitch angle a1 is a rotation angle centering on the Xp axis, a roll angle a2 is a rotation angle centering on the Zp axis, and a yaw angle a3 is a rotation angle centering on the Yp axis. In a state in which the projector 1A faces the screen 200, that is, a state in which respective axes of the coordinate system Xs-Ys-Zs are parallel to those of the coordinate system Xp-Yp-Zp, a1=0, a2=0, and a3=0. It is to be noted that the Xp axis in the orthogonal coordinate system Xp-Yp-Zp corresponds to a specific example of a "first axis" of the disclosure, and the Zp axis corresponds to a specific example of a "second axis" of the disclosure. The pitch angle a1 and the role angle a2 respectively correspond to specific examples of a "first rotation angle" and a "second rotation angle" of the disclosure.

An orthogonal coordinate system Xc-Yc-Zc is the moving coordinate system based on a camera of the portable terminal 1B. An Xc axis is the right-left direction, a Yp axis is the up-down direction, and a Zc axis is the front-back direction. The Zc axis matches an imaging optical axis (optical axis of the camera). In addition, a tilt angle b1 is a rotation angle centering on the Xc axis, a roll angle b2 is a rotation angle centering on the Zc axis, and a pan angle b3 is a rotation angle centering on the Yc axis. In a state in which the camera faces the projector 1A, that is, a state in which respective axes of the coordinate system Xp-Yp-Zp are parallel to those of the coordinate system Xc-Yc-Zc, θc=0, φc=0, and ψc=0. It is to be noted that in the orthogonal coordinate system Xc-Yc-Zc, the tilt angle b1 around the Xc axis and the roll angle b2 respectively correspond to specific examples of a "fourth rotation angle" and a "fifth rotation angle" of the disclosure.

Next, a bearing relation of the projector 1A, the portable terminal 1B, and the screen 200 is described with reference to FIG. 3. Here, it is assumed for convenience that the screen 200 is installed along a north-south direction, a projection azimuth of the projector 1A based on the true north is c1, and the projection azimuth of the portable terminal 1B is c2.

The projector 1A is a projection-type display apparatus that projects and displays an image onto the screen (the screen 200, the projection plane, to be described in the following). The projector 1A includes, for example, an image receiver 11, an image correction unit 12, an image display unit 13, a projection unit 14, a calibrated image generator 15, a yaw angle estimation unit 16, a projection azimuth detector 17A, a pitch angle/roll angle detector 17B, a captured image correction unit 18, a pan angle calculator 19, and a data receiver.

The image receiver 11 generates image information for processing at the image correction unit 12 on the basis of image information (image signal) Din to be inputted from outside.

On the basis of angle information (a1, a2, a3) outputted from the yaw angle estimation unit 16 and the pitch angle/roll angle detector 17B and an internal parameter of the projector 1A, the image correction unit 12 corrects image information D0 inputted from the image receiver 11 or image information Dc for calibration inputted from the calibrated image generator 15 by projection transformation, for example. The image correction unit 12 includes an FPGA (Field Programmable Gate Array) or a GPU (Graphics Processing Unit), for example. The image information generated by the image correction unit 12 is converted by a timing controller or a drive (driver circuit), etc., which are not illustrated, into image signals to be displayed on the image display unit 13 and supplied to the image display unit 13. The image signals are, for example, image signals corresponding to respective colors of R, G, and B. The image correction unit 12 corresponds to a specific example of a "correction unit" of the disclosure.

The image display unit 13 includes a reflective liquid crystal element such as an LCOS (Liquid Crystal On Silicon), for example, a transmissive liquid crystal element or a light modulation device of a DMD (Digital Micromirror Device). The image display unit 13 modulates light from an illumination optical system, which is not illustrated, on the basis of image information Dc1 and Dc3 inputted from the image correction unit 12. The light modulated by the image display unit 13 is outputted to the screen via the projection unit 14. It is to be noted that the image display unit 13 may also be a self-luminescent device such as an organic electroluminescent element, for example, in which case the illumination optical system is not necessary.

The projection unit 14 projects the image displayed by the image display unit 13 onto the screen 200 and has a projection illumination system and a reflecting mirror, for example. The projection optical system includes a projection lens unit, for example. The projection lens unit may include a so-called ultra-short focus lens or a long focus lens. The reflecting mirror converts an optical path of a light emitted from the projection optical system and guides the light to the screen 200. It is to be noted that the reflecting mirror may not be installed, depending on a layout of the projection optical system. In addition to these projection optical system and reflecting mirror, the projection unit 14 may also include a light source, an illumination optical system, a color separation optical system, and a color synthesis optical system, which are not illustrated. For example, in a case where the image display unit 13 is a liquid crystal display element, etc., the projection unit 14 includes the light source, and includes on the optical path between the light source and the projection optical system the illumination optical system, the color separation optical system, an image display element, and the color synthesis optical system, for example, in this order. In a case where the image display unit 13 is the self-luminescent device such as the organic electroluminescent element, the projection unit 14 may not, in particular, include the light source and the illumination optical system.

The calibrated image generator 15 generates an image for calibration (distortion correction) of the projection screen. The image is the image information Dc for calibration. The calibrated image generator 15 may not be provided, in which case a calibrated image may be inputted from an external PC, for example. The calibrated image generator 15 and the image receiver 11 are coupled to the image correction unit 12 through switching of a switch SW. It is desirable that the calibrated image is a white image having a rectangular shape, for example. This is because positional information at four corners is easy to detect.

The yaw angle estimation unit 16 analyzes the image generated by the captured image correction unit 18 and estimates an inclination (yaw angle a3, for example) of the projector 1A to the screen 200 on the basis of the internal parameter of the projector 1A. The yaw angle estimation unit 16 corresponds to a specific example of an "estimation unit" of the disclosure. In addition, the yaw angle a3 corresponds to a specific example of a "third rotation angle" of the disclosure.

The projection azimuth detector 17A includes an azimuth detection means such as a geomagnetic sensor, for example, and detects an azimuth (projection azimuth c1) of a reference axis (Zp axis) of the projector 1A.

The pitch angle/roll angle detector 17B includes an acceleration sensor or an inclination sensor, etc., for example, and detects the pitch angle a1 and the roll angle a2 of the projector 1A. It is to be noted that the pitch angle/roll angle detector 17B may not be provided in a case where it is possible to install the projector 1A without causing a physical rotation around the Xp axis and Zp axis (a1=0, a2=0) by, for example, mounting a level on the projector main body. The pitch angle/roll angle detector 17B corresponds to a specific example of a "first azimuth detector" of the disclosure. In addition, the pitch angle a1 and the role angle a2 correspond to the specific examples of the "first rotation angle" and the "second rotation angle" of the disclosure.

On the basis of the angle information (pan angle b3) outputted from the pan angle calculator 19, the angle information (tilt angle b1 and roll angle b2) received from the portable terminal 1B, and the internal parameter of the camera, the captured image correction unit 18 corrects a captured image D1 received from the portable terminal 1B by the projection transformation, for example.

The pan angle calculator 19 calculates the inclination of the portable terminal 1B to the projector 1A (pan angle b3) on the basis of azimuth angle information (projection azimuth c1) outputted from the projection azimuth detector 17A and the azimuth information (imaging azimuth c2) received from the portable terminal 1B.

The data receiver 20 receives, from the portable terminal 1B, information such as the captured image D1, the tilt angle b1, the roll angle b2, and the imaging azimuth c2, for example.

The portable terminal 1B includes an imaging unit 21, an imaging azimuth detector 22A, a tilt angle/roll angle detector 22B, and a data transmitter 23, etc., for example. It is possible to use, for example, a smartphone, a tablet PC, etc. as the portable terminal 1B. However, the terminal is not limited to the portable type, and various types of electronic apparatuses (imaging apparatuses) may be used as long as they are mounted with the camera (imaging unit 21) and the sensor (the imaging azimuth detector 22A or the imaging azimuth detector 22A and the tilt angle/roll angle detector 22B).

The imaging unit 21 images the image (projection screen) that is projected by the projector 1A onto the screen 200.

The imaging azimuth detector 22A includes the azimuth detection means such as the geomagnetic sensor, for example, and detects the azimuth (imaging azimuth c2) of the optical axis (Zc axis) of the camera.

The tilt angle/roll angle detector 22B includes the acceleration sensor or the inclination sensor, etc., for example, and detects the tilt angle b1 and the roll angle b2 of the portable terminal 1B at the time of imaging. It is to be noted that the tilt angle/roll angle detector 22B may not be provided in a case where it is possible to photograph with the portable terminal 1B fixed such that the tilt angle b1=1 and the roll angle b2=0 are physically satisfied, by, for example, utilizing a level app installed in the portable terminal 1B or a tripod. The tilt angle/roll angle detector 22B corresponds to a specific example of a "second azimuth detector" of the disclosure. In addition, the tilt angle b2 and the roll angle b2 correspond to the specific examples of the "fourth rotation angle" and the "fifth rotation angle" of the disclosure.

The data transmitter 23 transmits, to the projector 1A, information such as the captured image D1, the tilt angle b1, the roll angle b2, and the imaging azimuth c2, for example. A communication between the data transmitter 23 and the projector 1A, may be established by means of, for example, Wi-Fi, Bluetooth®, USB, etc.

It is to be noted that, of the above, the image correction unit 12, the yaw angle estimation unit 16, the captured image correction unit 18, and the pan angle calculator 19 correspond to a specific example of a "signal processor" of the disclosure. In addition, it is not necessarily requested that these image correction unit 12, yaw angle estimation unit 16, captured image correction unit 18, and pan angle calculator 19 be mounted on the projector 1A, but they may be mounted on an external device of the projector 1A.

[Processing and Operation]

Figure 4:
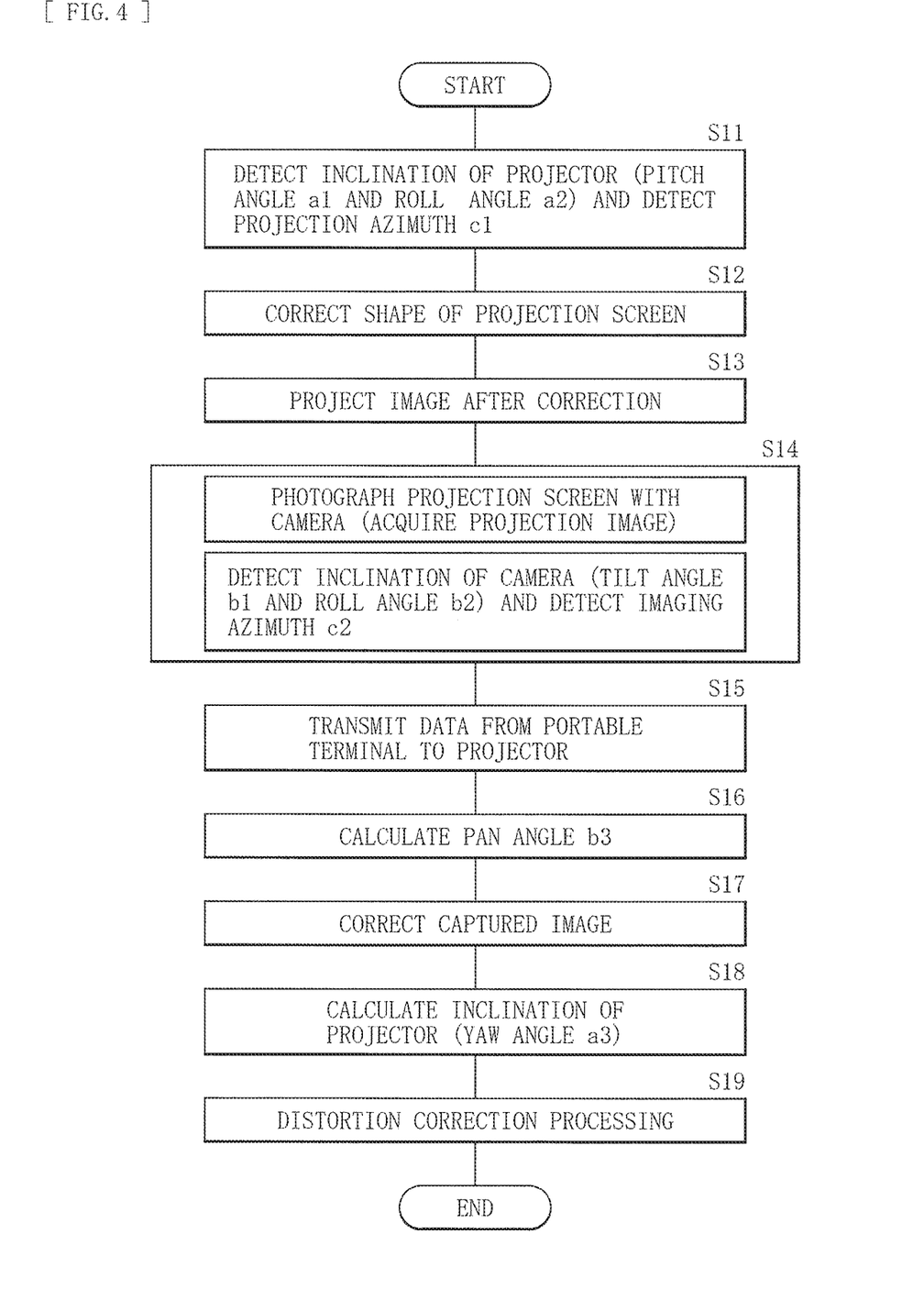
FIG. 4 is a diagram of flow of correction processing in the image projection system illustrated in FIG. 1.

In the following, an example of processing to correct the shape of the projection screen 30 as an operation of the image projection system 1 is described. FIG. 4 illustrates a flow of correction processing. It is to be noted that because a "correction method" of the disclosure is embodied in a description of the operation of the image projection system 1, the description thereof is omitted.

Figure 5:
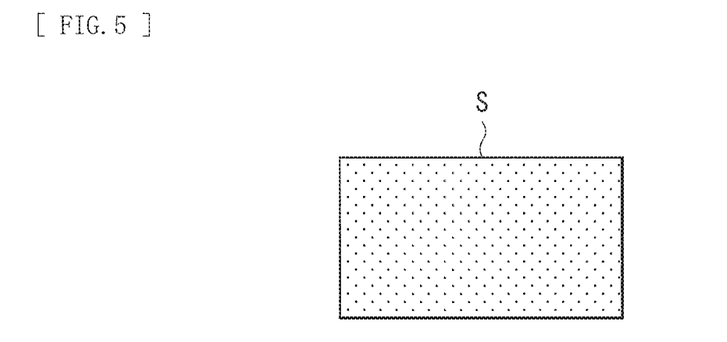
FIG. 5 is a schematic diagram of a projection screen with no distortion.
Figure 6:
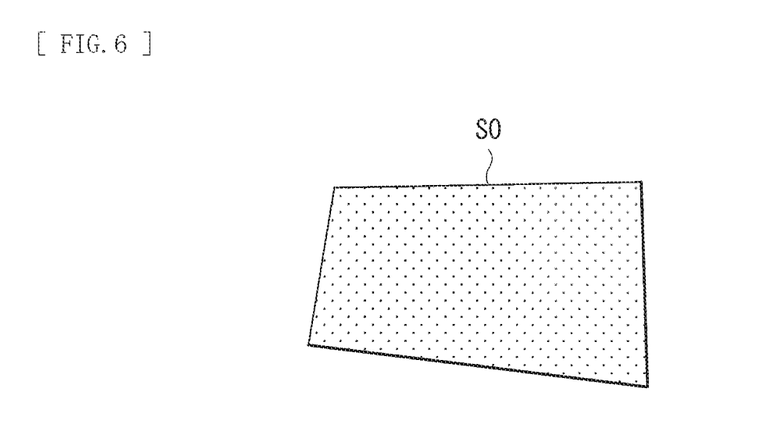
FIG. 6 is a schematic diagram of the projection screen in a case where the projector is installed in an inclined state.

Here, in a case where the projector 1A faces the screen 200 and the projection screen 30 is observed from a position in front of the screen 200, as illustrated in FIG. 5, the projection screen 30 is a projection screen (projection screen S) having a rectangle shape which is free from distortion or inclination. However, in a case where the projector 1A does not face the screen 200, such as a case in which the projector 1A is installed, being rotated with the Xp axis or the Yp axis as a center, for example, the shape of the projection screen 30 is distorted. In addition, in a case where rotation with the Zp axis as a center occurs, the projection screen 30 is inclined with the shape thereof maintained. FIG. 6 illustrates an example of such a projection screen (projection screen S0) when viewed from the position in front of the screen 200 in a case where the projector 1A does not face the screen 200. In the following, processing is described of a case in which the shape (distortion) of the projection screen S0 due to the inclination of the projector 1A as illustrated in FIG. 6 is corrected into the rectangular projection screen S free from distortion as illustrated in FIG. 5.

Figure 7:
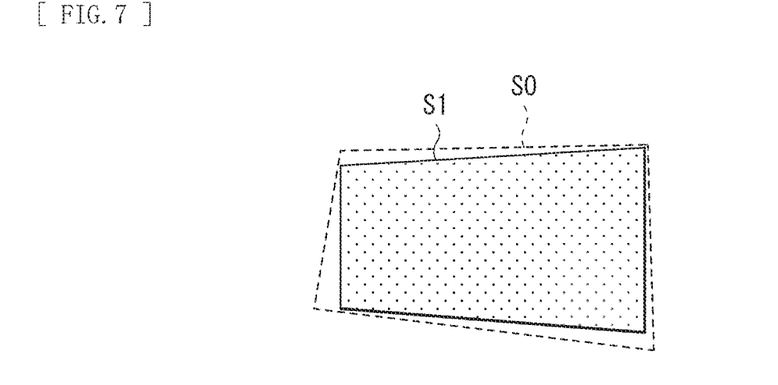
FIG. 7 is a schematic diagram of the projection screen that has been adjusted in view of a rotation angle of the projector.

First, the pitch angle/roll angle detector 17B detects the rotation angles (pitch angle a1 and roll angle a2) of the projector 1A at the time of projection (step S11). In addition, the projection azimuth detector 17A detects the projection azimuth c1. Subsequently, the image correction unit 12 corrects the distortion of the projection screen due to these pitch angle a1 and roll angle a2 (step S12). The correction processing corresponds to a specific example of "first correction processing" of the disclosure. As illustrated in FIG. 7, this makes the projection screen (projection screen S1) viewed from the position in front of the screen 200 a quadrangle that is distorted only due to the yaw angle a3. It is desirable that the projection screen S1 after the correction processing be of the largest size inscribed in the projection screen S0 before the correction.

It is to be noted that in a case where it is possible to install the projector 1A so that the pitch angle a1=0 and the roll angle a2=0 are satisfied, the detection process and correction processing (first correction processing) of the pitch angle a1 and the roll angle a2 described above may be omitted.

The image after this correction (after the first correction processing based on the pitch angle a1 and the roll angle a2) is projected onto the screen 200 (step S13). Specifically, the calibrated image generator 15 outputs the calibrated image (image information Dc) to the image correction unit 12. The image correction unit 12 corrects the distortion due to the pitch angle a1 and the roll angle a2, of the distortion of the projection screen of the inputted calibrated image. This calibrated image after the correction (image information Dc1) is projected from the projection unit 14 to the screen 200 through the image display unit 13. As the calibrated image to be used at this time, it is desirable to use an image suitable to correctly acquire the coordinates at the four corners of the projection screen through image analysis, such as an image whose whole surface is white and which has the highest tone, for example.

Figure 8:
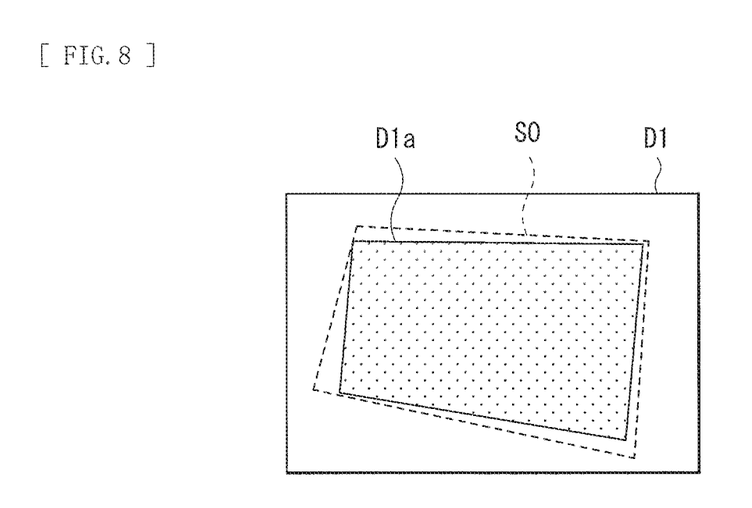
FIG. 8 is a schematic diagram of a captured image on the projection screen illustrated in FIG. 7.

Subsequently, a user photographs the calibrated image (projection screen) projected onto the screen 200 with the camera of the portable terminal 1B (step S14). This allows acquisition of the captured image (captured image D1) of the projection screen. FIG. 8 illustrates an example of the captured image D1. As such, the captured image D1 includes an image D1a which corresponds to the projection screen of the calibrated image (image information Dc1). In FIG. 8, the shape corresponding to the projection screen S0 is represented in a dashed line.

In addition, the tilt angle/roll angle detector 22B detects the tilt angle b1 and the roll angle b2, and the imaging azimuth detector 22A detects the imaging azimuth c2 of the camera optical axis. It is to be noted that the process of detecting the tilt angle b1 and the roll angle b2 may be omitted in a case where it is possible to photograph with the portable terminal 1B fixed such that the tilt angle b1=0 and the roll angle b2=0 are physically satisfied.

Subsequently, the data transmitter 23 of the portable terminal 1B transmits, to the data receiver 20 of the projector 1A, information on the acquired captured image D1, the tilt angle b1, the roll angle b2, and the imaging azimuth c2 (step S15). In the projector 1A, among the information acquired by the data receiver 20, the information on the captured image D1, the tilt angle b1, and the roll angle b2 is outputted to the captured image correction unit 18, and the information on the imaging azimuth c2 is outputted to the pan angle calculator 19.

Next, using the following expression (1), the pan angle calculator 19 calculates an angle defined between the projector 1A and the portable terminal 1B (camera), that is, the pan angle b3, from the projection azimuth c1 detected by the projection azimuth detector 17A and the imaging azimuth c2 detected by the imaging azimuth detector 22A (step S16). Information on the calculated pan angle b3 is outputted to the captured image correction unit 18.

$$b3=c1-c2 \qquad (1)$$

Figure 9:
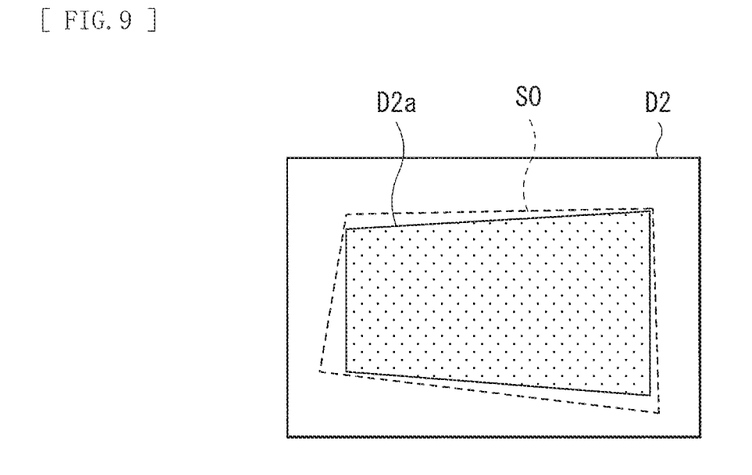
FIG. 9 is a schematic diagram of the captured image after being corrected.

Subsequently, the captured image correction unit 18 corrects the captured image D1 on the basis of the angle information on the inputted tilt angle b1 and roll angle b2, and the calculated pan angle b3 (step S17). Specifically, the captured image D1 is converted to be equivalent to the captured image photographed with a posture that defines the tilt angle b1=0, the roll angle b2=0, and the pan angle b3=0. That is, the captured image D1 photographed from an arbitrary point of view is converted by projection transformation, for example, into an imaginary captured image (captured image D2) which is photographed from a point of view facing the projector 1A. FIG. 9 illustrates an example of the captured image D2 that is generated by this conversion processing. As such, the captured image D2 includes an image D2a corresponding to the projection screen of the calibrated image (image information Dc1). The image D2a is closer to a rectangle shape than the shape of the image D1a. In FIG. 9, the shape corresponding to the projection screen S0 is represented in the dashed line.

The image D2a in the captured image D2 is equivalent to an image of the quadrangular projection screen (projection screen S1 of FIG. 7) that is distorted due to the yaw angle a3 of the projector 1A and photographed from the point of view in a direction facing the projector 1A (direction of the reference axis). Information on the captured image D2 is outputted to the yaw angle estimation unit 16.

Next, the yaw angle estimation unit 16 calculates a ratio of a length of a left side and that of a right side of the image D2a in the captured image D2 and calculates the yaw angle a3, namely the inclination of the projector 1A to the screen 200, on the basis of the calculated ratio and the internal parameter of the project 1A (step S18). Information on the calculated yaw angle a3 is outputted to the image correction unit 12.

Figure 10:
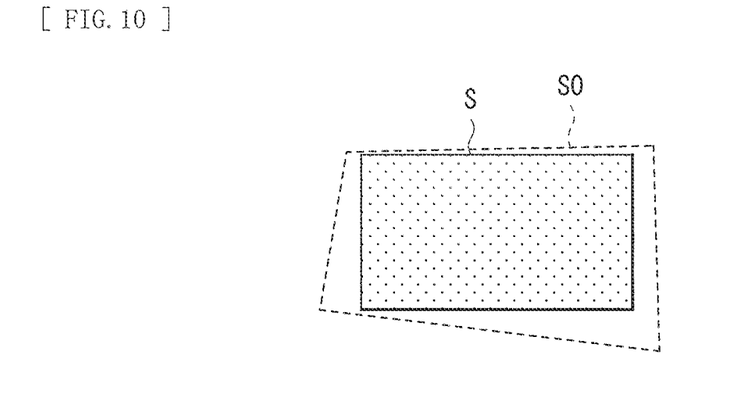
FIG. 10 is a schematic diagram of the projection screen after correction processing.

Lastly, the image correction unit 12 corrects the distortion of the projection screen due to the yaw angle a3 (performs second correction processing) (step S19). This allows the projection screen S0 having the distortion as illustrated in FIG. 6 to be corrected into the rectangular projection screen S, as illustrated in FIG. 10, which is free from the distortion and the inclination. That is, the image correction unit 12 is able to correct the image information D0 outputted from the image receiver 11 on the basis of the detected pitch angle a1 and roll angle a2, and the calculated yaw angle a3. This image information after the correction (image information D3) is projected onto the screen 200 via the image display unit 13 and the projection unit 14.

[Effects]

As described above, the image projection system 1 of the embodiment is able to estimate the inclination of the projector 1A to the screen 200 (yaw angle a3, for example) on the basis of the projection azimuth c1, the imaging azimuth c2, and the captured image D1 and correct the shape of the projection screen 30 on the basis of this inclination. For example, in a case where the projector 1A is installed being inclined to the screen 200, etc., the projection screen 30 of the projector 1A may be distorted. However, correction of such a distortion is possible with a system having a simple configuration. For example, it is no longer necessary to detect the positional information (longitude, latitude, and altitude) at the four corners of the projection screen by means of GPS, which thus makes it possible to correct the projection screen by using the projector 1A and the portable terminal 1B that have a simpler configuration. In addition, the portable terminal is not necessarily provided with a special function to irradiate with the guide light for calibration, for example. Therefore, it is possible to perform the image correction using the low-cost and general-purpose portable terminal 1B.

So far, the description has been given with reference to the embodiments. However, the disclosure is not limited to the embodiments described above and it is possible to make various modifications thereto. In addition, it should be noted that the effects described herein are merely an example and may be other effects or may further include other effects.

For example, the disclosure is able to have the following configurations.

(1)

An image projection system including:

a projection-type display apparatus that projects an image onto a projection plane and has a first azimuth detector which detects a projection azimuth;

an imaging apparatus that images a projection screen of the image and has a second azimuth detector which detects an imaging azimuth; and a signal processor that performs correction processing of the image, in which the signal processor has an estimation unit that estimates an inclination of the projection-type display apparatus to the projection plane, on a basis of the projection azimuth detected by the first azimuth detector, the imaging azimuth detected by the second azimuth detector, and a captured image acquired by the imaging apparatus, and a correction unit that corrects a shape of the projection plane on the basis of the inclination of the projection-type display apparatus estimated by the estimation unit.

(2)

The image projection system according to (1), in which the signal processor includes a captured image correction unit that corrects the captured image on the basis of an angle which is defined by the projection azimuth detected by the first azimuth detector and the imaging azimuth detected by the second azimuth detector.

(3)

The image projection system apparatus according to (2), in which the estimation unit estimates the inclination of the projection-type display apparatus on the basis of the captured image corrected by the captured image correction unit.

(4)

The image projection system according to (3), in which the projection-type display apparatus includes a first rotation angle detector that detects an own rotation angle centering on one or more axes of three orthogonal axes, and the signal processor performs first correction processing, the first correction processing correcting the shape of the projection screen on the basis of the rotation angle detected by the first rotation angle detector.

(5)

The image projection system according to (4), in which the imaging apparatus images the projection screen after the first correction processing.

(6)

The image projection system according to (4) or (5), in which the rotation angle detected by the first rotation angle detector includes a first rotation angle centering on a first axis along a horizontal direction in a plane that is orthogonal to a projection optical axis and a second rotation angle centering on a second axis along the projection optical axis.

(7)

The image projection system according to (6), in which the imaging apparatus includes a second rotation angle detector that detects an own rotation angle centering on one or more axes of three orthogonal axes, and the signal processor corrects the captured image on the basis of the rotation angle detected by the second rotation angle detector and an angle that is defined by the projection azimuth and the imaging azimuth.

(8)

The image projection system according to (7), in which the rotation angle detected by the second rotation angle detector includes a fourth rotation angle centering on an axis along the horizontal direction in a plane that is orthogonal to an imaging optical axis and a fifth rotation angle centering on an axis along the imaging optical axis.

(9)

The image projection system according to (7) or (8), in which the estimation unit calculates a third rotation angle centering on a third axis of the three axes in the projection-type display apparatus, on the basis of the captured image after the correction, and the correction unit performs second correction processing, the second correction processing correcting the shape of the projection screen on the basis of the third rotation angle calculated by the estimation unit.

(10)

The image projection system according to any one of (1) to (9), in which the projection-type display apparatus includes the signal processor.

(11)

A correction method including:

estimating an inclination of a projection-type display apparatus to a projection plane on a basis of a projection azimuth of the projection-type display apparatus that projects an image onto the projection plane, an imaging azimuth of an imaging apparatus that images a projection screen of the image, and a captured image acquired by the imaging apparatus; and correcting a shape of the projection screen on the basis of the estimated inclination of the projection-type display apparatus.

(12)

The correction method according to (11), including:

correcting the captured image on the basis of an angle defined by the projection azimuth and the imaging azimuth.

(13)

The correction method according to (12), including:

estimating the inclination of the projection-type display apparatus on the basis of the corrected captured image.

(14)

The correction method according to (13), including:

detecting an own rotation angle centering on one or more axes of three orthogonal axes in the projection-type display apparatus; and performing first correction processing, the first correction processing correcting the shape of the projection screen on the basis of the detected rotation angle.

(15)

The correction method according to (14), in which the projection screen after the first correction processing is imaged by the imaging apparatus.

(16)

The correction method according to (14) or (15), in which the rotation angle detected by the projection-type display apparatus includes a first rotation angle centering on a first axis along a horizontal direction in a plane that is orthogonal to a projection optical axis and a second rotation angle centering on a second axis along the projection optical axis.

(17)

The correction method according to (16), including:

detecting an own rotation angle centering on one or more axes of three orthogonal axes in the imaging apparatus; and correcting the captured image on the basis of the detected rotation angle and an angle defined by the projection azimuth and the imaging azimuth.

(18)

The correction method according to (17), in which the rotation angle detected in the imaging apparatus includes a fourth rotation angle centering on an axis along the horizontal direction in a plane that is orthogonal to an imaging optical axis and a fifth rotation angle centering on an axis along the imaging optical axis.

(19)

The correction method according to (17) or (18), including:

calculating a third rotation angle centering on a third axis of the three axes in the projection-type display apparatus on the basis of the captured image after the correction; and performing second correction processing, the second correction processing correcting the shape of the projection screen on the basis of the calculated third rotation angle.

This application claims the benefits of Japanese Priority Patent Application JP2016-70435 filed on Mar. 31, 2016, the entire contents of which are incorporated herein by reference.

It should be understood that those skilled in the art could conceive various modifications, combinations, sub-combinations, and alterations depending on design requirements and other factors, insofar as they are within the scope of the appended claims or the equivalents thereof.

The invention claimed is:

1. An image projection system comprising:

a projection-type display apparatus that projects an image onto a projection plane, the projection-type display apparatus including a first azimuth detector that detects a projection azimuth;

an imaging apparatus that images a projection screen of the image, the imaging apparatus including a second azimuth detector that detects an imaging azimuth; and a signal processor that performs correction processing of the image, wherein the signal processor includes an estimation unit that estimates an inclination of the projection-type display apparatus to the projection plane based on the projection azimuth detected by the first azimuth detector, the imaging azimuth detected by the second azimuth detector, and a captured image acquired by the imaging apparatus, and a correction unit that corrects a shape of the projection plane based on the inclination of the projection-type display apparatus estimated by the estimation unit.

2. The image projection system according to claim 1, wherein the signal processor includes a captured image correction unit that corrects the captured image based on an angle, which is defined by the projection azimuth detected by the first azimuth detector and the imaging azimuth detected by the second azimuth detector.

3. The image projection system apparatus according to claim 2, wherein the estimation unit estimates the inclination of the projection-type display apparatus based on the captured image corrected by the captured image correction unit.

4. The image projection system according to claim 1, wherein the projection-type display apparatus includes the signal processor.

5. An image projection system comprising:

a projection-type display apparatus that projects an image onto a projection plane, the projection-type display apparatus including a first azimuth detector that detects a projection azimuth;

an imaging apparatus that images a projection screen of the image, the imaging apparatus including a second azimuth detector that detects an imaging azimuth; and a signal processor that performs correction processing of the image, wherein the signal processor includes an estimation unit that estimates an inclination of the projection-type display apparatus to the projection plane based on the projection azimuth detected by the first azimuth detector, the imaging azimuth detected by the second azimuth detector, and a captured image acquired by the imaging apparatus, and a correction unit that corrects a shape of the projection plane based on the inclination of the projection-type display apparatus estimated by the estimation unit, wherein the signal processor includes a captured image correction unit that corrects the captured image based on an angle, which is defined by the projection azimuth detected by the first azimuth detector and the imaging azimuth detected by the second azimuth detector, wherein the estimation unit estimates the inclination of the projection-type display apparatus based on the captured image corrected by the captured image correction unit, wherein the projection-type display apparatus includes a first rotation angle detector that detects an own rotation angle centering on one or more axes of three orthogonal axes, and wherein the signal processor performs first correction processing, the first correction processing correcting the shape of the projection screen based on the rotation angle detected by the first rotation angle detector.

6. The image projection system according to claim 5, wherein the imaging apparatus images the projection screen after the first correction processing.

7. The image projection system according to claim 5, wherein the rotation angle detected by the first rotation angle detector includes a first rotation angle centering on a first axis along a horizontal direction in a plane that is orthogonal to a projection optical axis and a second rotation angle centering on a second axis along the projection optical axis.

8. The image projection system according to claim 7, wherein
the imaging apparatus includes a second rotation angle detector that detects an own rotation angle centering on one or more axes of three orthogonal axes, and
the signal processor corrects the captured image based on the rotation angle detected by the second rotation angle detector and an angle that is defined by the projection azimuth and the imaging azimuth.

9. The image projection system according to claim 8, wherein the rotation angle detected by the second rotation angle detector includes a fourth rotation angle centering on an axis along the horizontal direction in a plane that is orthogonal to an imaging optical axis and a fifth rotation angle centering on an axis along the imaging optical axis.

10. The image projection system according to claim 8, wherein
the estimation unit calculates a third rotation angle centering on a third axis of the three axes in the projection-type display apparatus based on the captured image after correction by the signal processor, and
the correction unit performs second correction processing, the second correction processing correcting the shape of the projection screen based on the third rotation angle calculated by the estimation unit.

11. A correction method comprising:
estimating an inclination of a projection-type display apparatus to a projection plane based on a projection azimuth of the projection-type display apparatus that projects an image onto the projection plane, an imaging azimuth of an imaging apparatus that images a projection screen of the image, and a captured image acquired by the imaging apparatus;
correcting a shape of the projection screen based on the estimated inclination of the projection-type display apparatus;
correcting the captured image based on an angle defined by the projection azimuth and the imaging azimuth;
estimating the inclination of the projection-type display apparatus based on the corrected captured image;
detecting an own rotation angle centering on one or more axes of three orthogonal axes in the projection-type display apparatus; and
performing first correction processing, the first correction processing correcting the shape of the projection screen based on the detected rotation angle.

12. The correction method according to claim 11, wherein the projection screen is imaged by the imaging apparatus after the first correction processing.

13. The correction method according to claim 11, wherein the rotation angle detected by the projection-type display apparatus includes a first rotation angle centering on a first axis along a horizontal direction in a plane that is orthogonal to a projection optical axis and a second rotation angle centering on a second axis along the projection optical axis.

14. The correction method according to claim 13, further comprising:
detecting an own rotation angle centering on one or more axes of three orthogonal axes in the imaging apparatus; and
correcting the captured image based on the detected rotation angle and an angle defined by the projection azimuth and the imaging azimuth.

15. The correction method according to claim 14, wherein the rotation angle detected in the imaging apparatus includes a fourth rotation angle centering on an axis along the horizontal direction in a plane that is orthogonal to an imaging optical axis and a fifth rotation angle centering on an axis along the imaging optical axis.

16. The correction method according to claim 14, further comprising:
calculating a third rotation angle centering on a third axis of the three axes in the projection-type display apparatus on the basis of the captured image after the correction; and
performing second correction processing, the second correction processing correcting the shape of the projection screen based on the calculated third rotation angle.

* * * * *